Patented Jan. 22, 1946

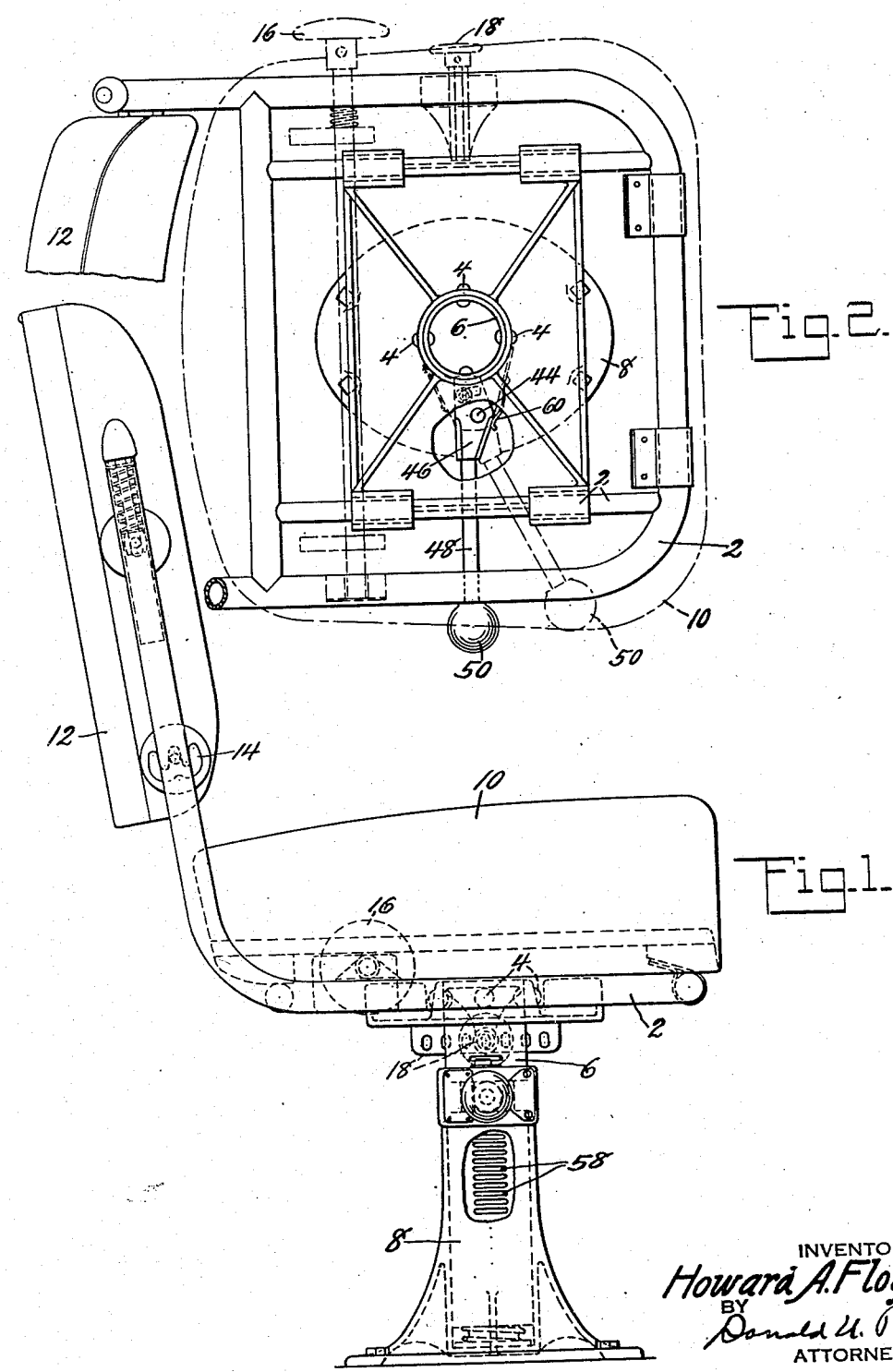

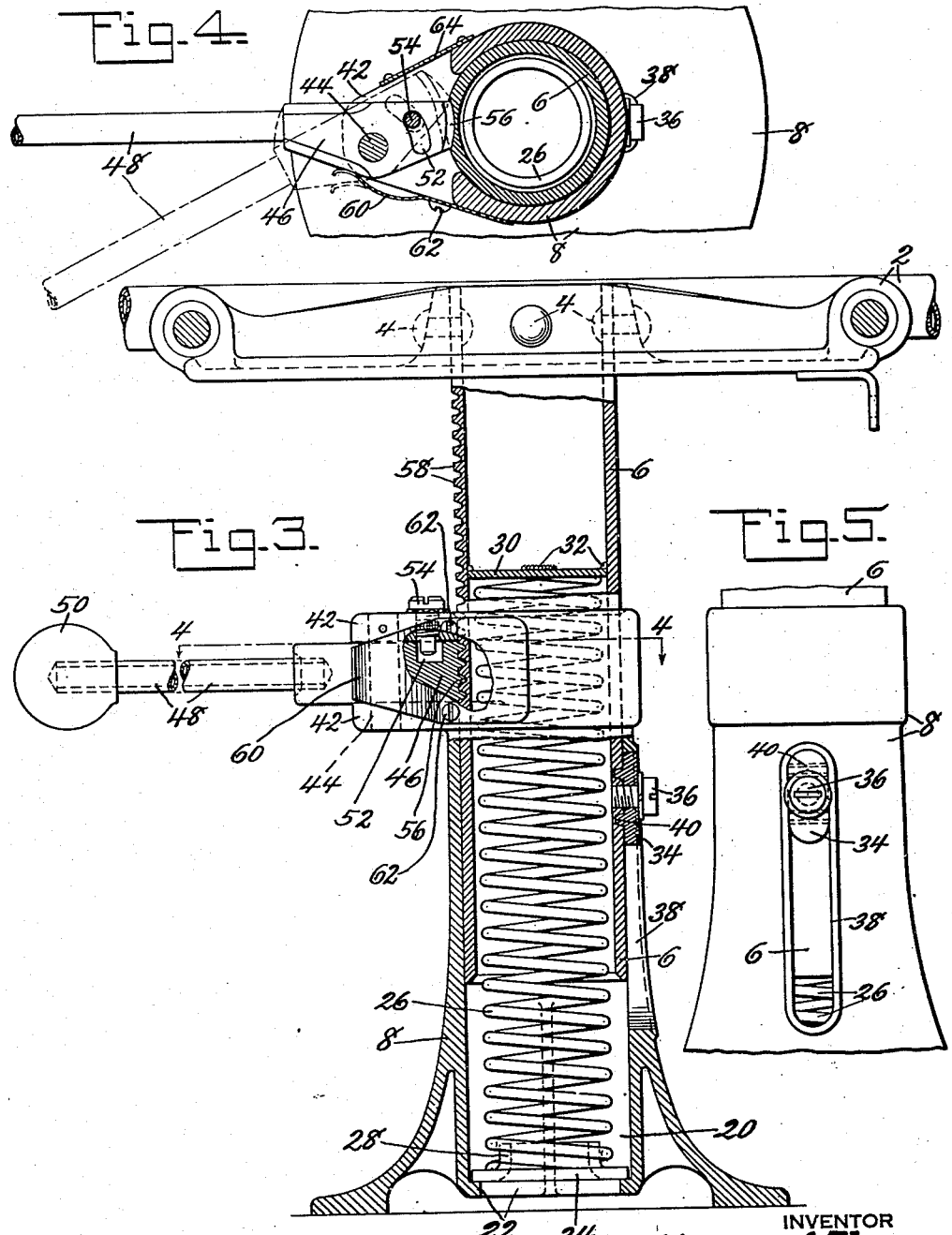

2,393,242

UNITED STATES PATENT OFFICE 2,393,242

ADJUSTABLE SEAT

Howard A. Flogaus, Media, Pa., assignor to ACF-Brill Motors Company, New York, N. Y., a corporation of Delaware Application May 23, 1942, Serial No. 444,215

3 Claims. (Cl. 155—52)

This invention relates to adjustable seats and particularly to seats of the type which may be adjusted as desired to various heights or elevated positions. The invention is especially adapted for use with seats such as are provided for operators of buses, motor coaches and like vehicles, and has to do particularly with an improved mechanism for locking the seat in any one of a plurality of selected elevated positions.

An object of the invention is to provide an adjustable seat in which a pivoted locking member operated by a handle conveniently located at the side of the seat below the seat cushion serves to securely lock the seat in the selected adjusted position.

Another object of the invention is the provision of an adjustable seat of this type in which resilient means act to support the seat upon release of the locking mechanism, when the seat may then be lowered by the weight of the occupant or permitted to be raised by action of the resilient means to the desired position, release of the operating handle causing the locking member to automatically lock the seat in adjusted position.

These and other objects of the invention will be apparent to persons skilled in the art by reference to the following description and accompanying drawings, in which:

Figure 1 is a side elevation view of a seat embodying the invention, a portion of the seat support being broken away to better disclose the construction of the mechanism;

Fig. 2 is a top plan view of the seat having a part thereof broken away to better disclose the locking member, the latter being shown in operative position by full lines and in inoperative or released position by dotted lines;

Fig. 3 is an enlarged sectional view taken through the seat pedestal or support, a portion of one of the parts being broken away to better disclose the pivoted locking member in operative position;

Fig. 4 is a sectional view taken on the line 4—4, Fig. 3; and

Fig. 5 is an enlarged view of a portion of the seat pedestal showing a stop member arranged to ride in a slot or opening in the pedestal whereby vertical movement of the seat is limited and rotation thereof prevented.

Referring now more in detail to the drawings, and particularly to Fig. 1, it will be seen that the invention is embodied in a bus operator's seat comprising a tubular seat frame 2 secured, as clearly shown in Figs. 2 and 3, by rivets 4 to a cylindrical adjusting member 6 slidably arranged within a pedestal casting 8. The seat is provided with a cushion 10, as is customary, and in the present instance has an adjustable seat back 12 controlled by adjusting mechanism 14. The seat may also be provided with cushion adjusting or shifting mechanism shown in Fig. 2 as controlled by operating means 16 and 18; however, this is merely by way of illustration since the instant invention is not concerned with either this feature or the particular type of seat back. The seat frame and back construction may be of any suitable type, the present invention having to do only with the seat elevating or height adjusting mechanism now to be described.

The pedestal casting 8, as shown in Fig. 3, is formed with an interior tubular portion 20 terminating at the bottom in a circular ledge 22 on which is supported a plate 24 providing a seat for a spiral spring 26 arranged within the pedestal and extending upwardly into the adjusting member 6. The spring is centered in the pedestal casting by means of an upwardly extending portion 28 formed in the plate 24, the upper end of the spring bearing against a plate 30 welded as at 32 inside of the cylindrical adjusting member 6. A stop 34 secured as by the machine screw 36 to one side of the adjusting member 6 is arranged to ride up and down in a vertical elongated slot 38 formed in the pedestal casting, the purpose of this being to prevent separation of the parts and to limit relative vertical movement of the adjusting member in the pedestal casting; also to prevent rotation of the adjusting member. The arrangement and relative positioning of the several parts is such that the spiral spring 26 is maintained constantly under compression, the spring being of sufficient strength to just overbalance the weight of the seat in order to raise the latter when lower than desired. The stop 34 is formed with a plurality of horizontal ribs or lugs 40 closely fitting into corresponding slots in the adjusting member, thus relieving the machine screw 36 of impact and shearing forces when the seat is raised or lowered to the limit of its movement. The seat may be lowered against the action of spring 26 or permitted to be raised thereby to the desired position, the seat then being securely retained in the selected adjusted position by the mechanism about to be described.

The pedestal casting 8 is formed at its top portion with a pair of vertically spaced supporting members 42 projecting outwardly from the pedestal and pivotally supporting, by means of the pin 44, a locking member 46. The ratchet member is provided with an operating handle 48 to the end portion of which is secured a knob 50. Formed in the upper face of the pivoted locking member is an arcuate slot 52 into which extends a stop stud 54 carried by the upper supporting member 42. This slot 52 is of such length as to permit the necessary pivotal movement of the locking member, which in the present instance as viewed in Fig. 4, is approximately 27 degrees. The pivoted locking member 46 is provided with a plurality of horizontally extending teeth 56 adapted to be selectively engaged with, upon swinging of the locking member and vertical movement of the adjusting member, any set or group of a row of similar teeth 58 recessed or cut in the otherwise smooth surface of the adjusting member 6, as clearly shown in Fig. 3. A large number of minute vertical adjustments for the seat is thus provided. It will be seen from the drawings, and particularly Fig. 4, that the teeth 56 and 58 are curved with the roots of the teeth curved substantially concentric with the axis of pin 44. A flat spring 60 secured as by the screws 62 to the supporting members 42 constantly urges the locking member toward the tooth engaging or operative position; that is, in a clockwise direction as viewed in Fig. 4, thus causing the locking member upon release of the handle 48 after adjustment of the seat to automatically lock the seat in the selected adjusted position. The opening between the spaced supporting members 42 at the side opposite the spring 60 is closed by a cover plate 64 secured in place in any suitable manner.

While the invention has been described more or less in detail, it is believed that various modifications thereof will occur to those skilled in the art and all such modifications are contemplated as will come within the scope of the appended claims.

What is claimed is:

1. In a vertically adjustable seat, the combination of a supporting pedestal, a substantially smooth surfaced hollow cylindrical adjusting member arranged within and vertically slidable relative to said supporting pedestal, a seat frame secured to the adjusting member, said smooth surfaced hollow adjusting member being provided with a vertically extending row of concave segmental teeth notched in the smooth peripheral surface thereof and having their center of curvature located outside the periphery of said adjusting member, a pair of vertically spaced supporting members extending from the upper portion of said pedestal, a locking member pivotally carried by said supporting members and arranged wholly on the same side of said adjusting member as the center of curvature of the concave segmental teeth, said locking member being formed with a plurality of teeth adapted to be selectively engaged with the concave segmental teeth of said vertical row of teeth upon horizontal swinging of said locking member whereby to retain said seat in any one of a plurality of vertically adjusted positions, stop means detachably secured to said adjusting member and contacting said pedestal to limit vertical movement of said seat, a plate member secured within the hollow adjusting member adjacent the upper end thereof and resilient means housed within the hollow adjusting member and compressed between said pedestal and plate and acting to constantly urge the seat frame upward to the limit of its vertical movement.

2. In a vertically adjustable seat the combination of a tubular supporting pedestal, a substantially tubular adjusting member slidably mounted within said tubular supporting pedestal, a seat frame secured to said adjusting member, a locking member pivotally carried by said pedestal adjacent the upper end thereof for swinging movement in a substantially horizontal plane, teeth formed on the inner end of said locking member, and a vertically arranged row of teeth formed on said tubular adjusting member, the root of all of said teeth being curved substantially concentric with the pivotal axis of said locking member.

3. In a vertically adjustable seat the combination of a tubular supporting pedestal, a substantially tubular adjusting member slidably mounted within said tubular supporting pedestal, a seat frame secured to said adjusting member, resilient means housed within said pedestal and tubular adjusting member and constantly urging the same apart, a locking member carried by said pedestal adjacent the upper end thereof and swingable in a substantially horizontal plane about a substantially vertically extending axis, said locking member including an operating handle extending substantially to the side edge of the seat frame and a plurality of teeth formed on the inner end remote from the handle, and a vertically arranged row of teeth recessed in said tubular adjusting member, all of said teeth being curved and having the root thereof curved substantially concentric with said vertically extending axis.

HOWARD A. FLOGAUS.